Aug. 23, 1938.     P. MANISCALCO     2,128,006
COMBINATION GASOLINE AND OIL ENGINE
Filed Jan. 11, 1937     5 Sheets-Sheet 1

Inventor
Pietro Maniscalco
by J Daniel Stuwe
Attorney.

Aug. 23, 1938.   P. MANISCALCO   2,128,006
COMBINATION GASOLINE AND OIL ENGINE
Filed Jan. 11, 1937   5 Sheets-Sheet 2

Fig. 2

Inventor
Pietro Maniscalco
by J. Daniel Stuwe
Attorney.

Aug. 23, 1938.   P. MANISCALCO   2,128,006
COMBINATION GASOLINE AND OIL ENGINE
Filed Jan. 11, 1937   5 Sheets-Sheet 3

Inventor
Pietro Maniscalco
by J. Daniel Stuwe
Attorney.

Aug. 23, 1938. P. MANISCALCO 2,128,006
COMBINATION GASOLINE AND OIL ENGINE
Filed Jan. 11, 1937 5 Sheets-Sheet 4
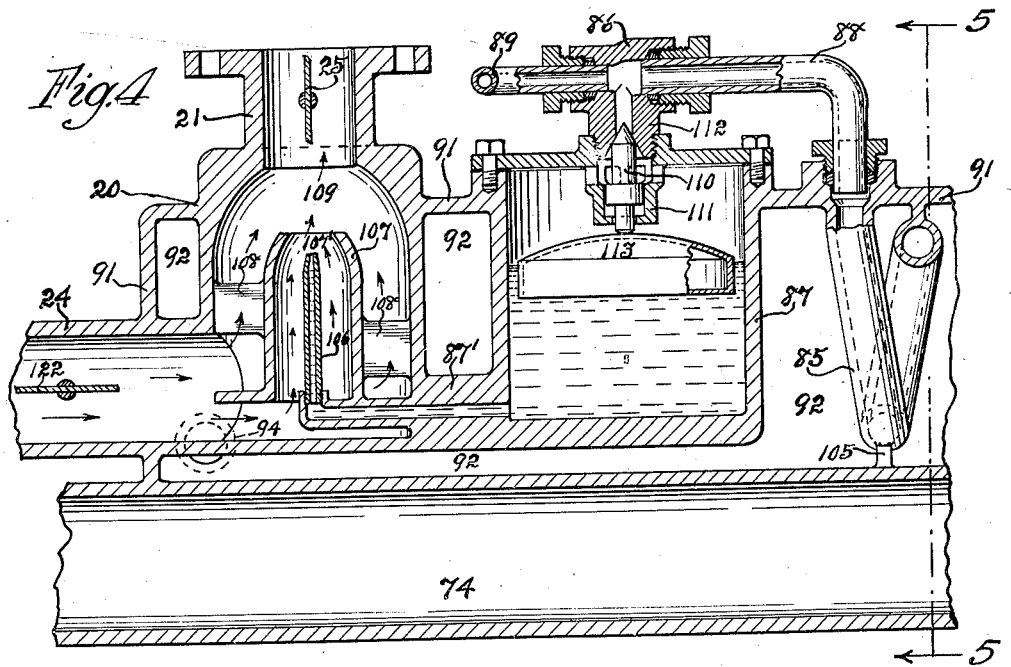
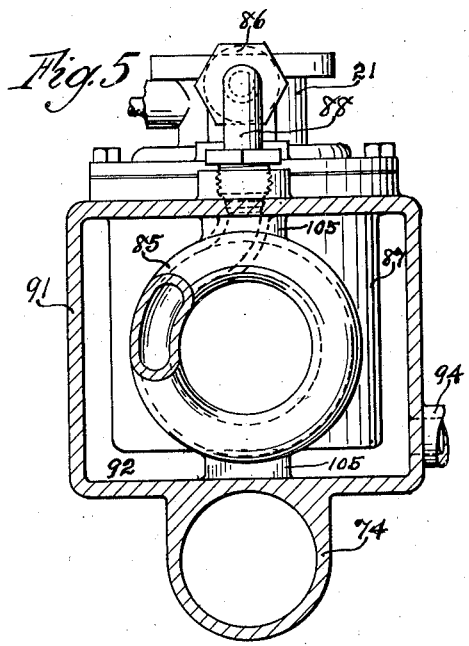
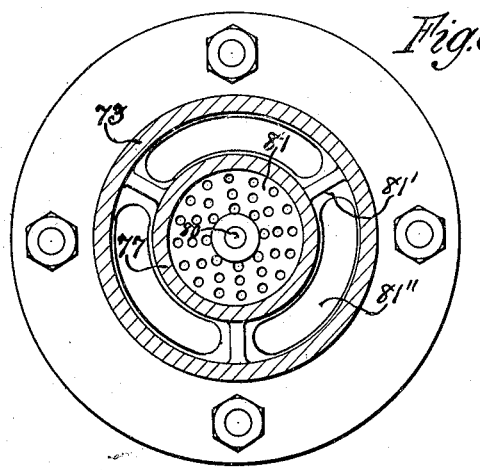
Inventor
Pietro Maniscalco
by J Daniel Stuwe
Attorney.

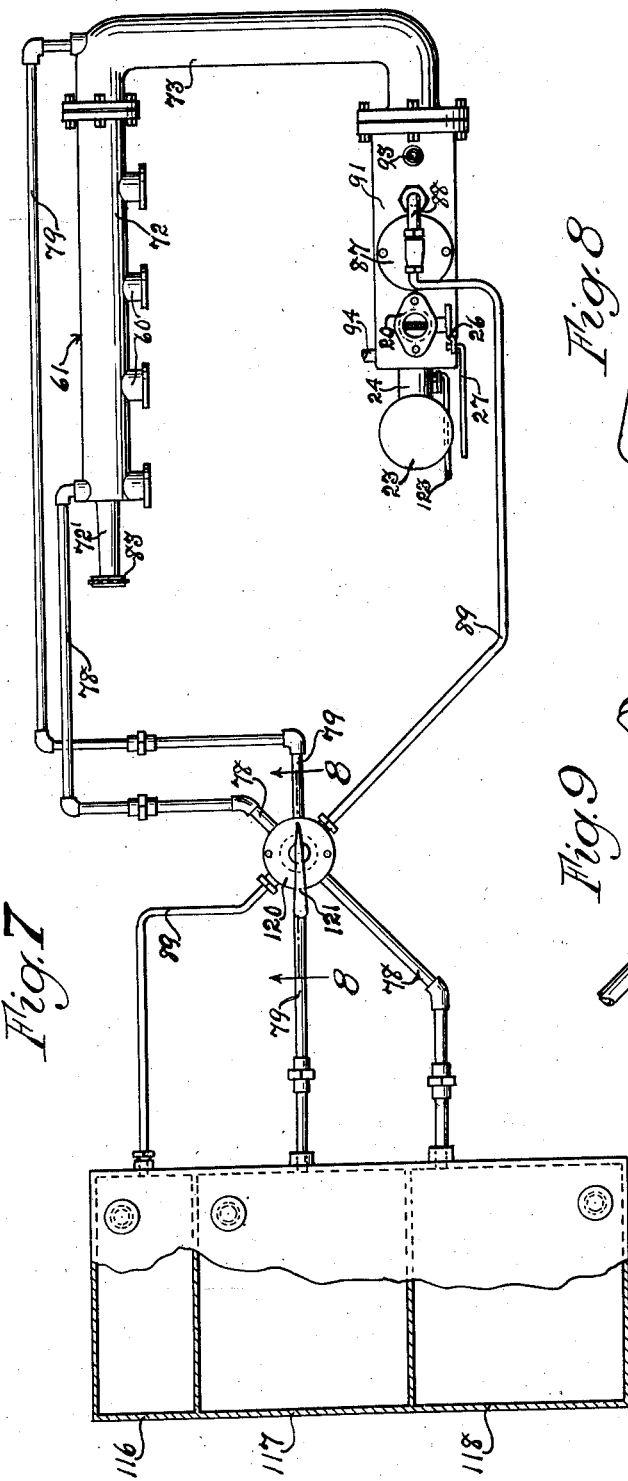

Patented Aug. 23, 1938

2,128,006

UNITED STATES PATENT OFFICE 2,128,006

COMBINATION GASOLINE AND OIL ENGINE

Pietro Maniscalco, Toledo, Ohio

Application January 11, 1937, Serial No. 120,021

14 Claims. (Cl. 123—127)

This invention relates to a new and improved combination gasoline and oil engine.

One of the main objects of this invention is to provide an internal combustion engine which is arranged and adapted to utilize various types of liquid hydrocarbon fuels, of different grades and densities, such as gasoline, light fuel oil, and also heavy oil or crude oil.

A further object of this invention is to provide such an engine wherein the crude or heavy oil is mixed and diffused and preheated, and is thereafter fed to the engine in the same manner as the light fuel oil.

A further object of this invention is to provide such an engine which is arranged and equipped to utilize the hot exhaust gas from the engine for heating the light fuel oil; and likewise to utilize the exhaust gas to a greater extent for heating the heavy oil, than for heating the more volatile light oil, and furthermore agitate and diffuse said heavy oil, before conveying said oils to the intake manifold.

A still further object of this invention is to provide such an engine wherein the oil as well as gasoline is fed thru the carburetor to the intake manifold, the hot exhaust gas being utilized for preheating and vaporizing the oil, and the heated oil is condensed before entering the carburetor, so that the gasoline, and also the heated and diffused and mixed oil can be fed thru the carburetor to the manifold.

Another object of this invention is to provide an improved construction comprising a carburetor adapted for feeding gasoline and also oil to the intake manifold and provided with condensing means in the oil conducting channel leading to the carburetor, also a water jacket surrounding both of them, and having a part of the exhaust manifold joined thereto, all cast as one integral construction.

These and various other objects and advantages are attained with this invention, as will become apparent from the following description taken in connection with the accompanying drawings, in which:

Fig. 2 is an end elevational view thereof, partly in section, taken on line 2—2 of Fig. 1.

Fig. 4 is a longitudinal sectional view of the carburetor and its water jacket with a part of the exhaust manifold, arranged as one integral construction.

Fig. 5 is a cross-sectional view taken on line 5—5 of Fig. 4.

Fig. 6 is an enlarged cross-sectional view taken on line 6—6 of Fig. 3.

Fig. 7 is a diagrammatic view of the mechanism for storing and selectively admitting various kinds of liquid fuel to the engine.

Fig. 8 is an enlarged sectional view, taken on line 8—8 of Fig. 7.

Fig. 9 is a sectional view, taken on line 9—9 of Fig. 8.

Figure 1:
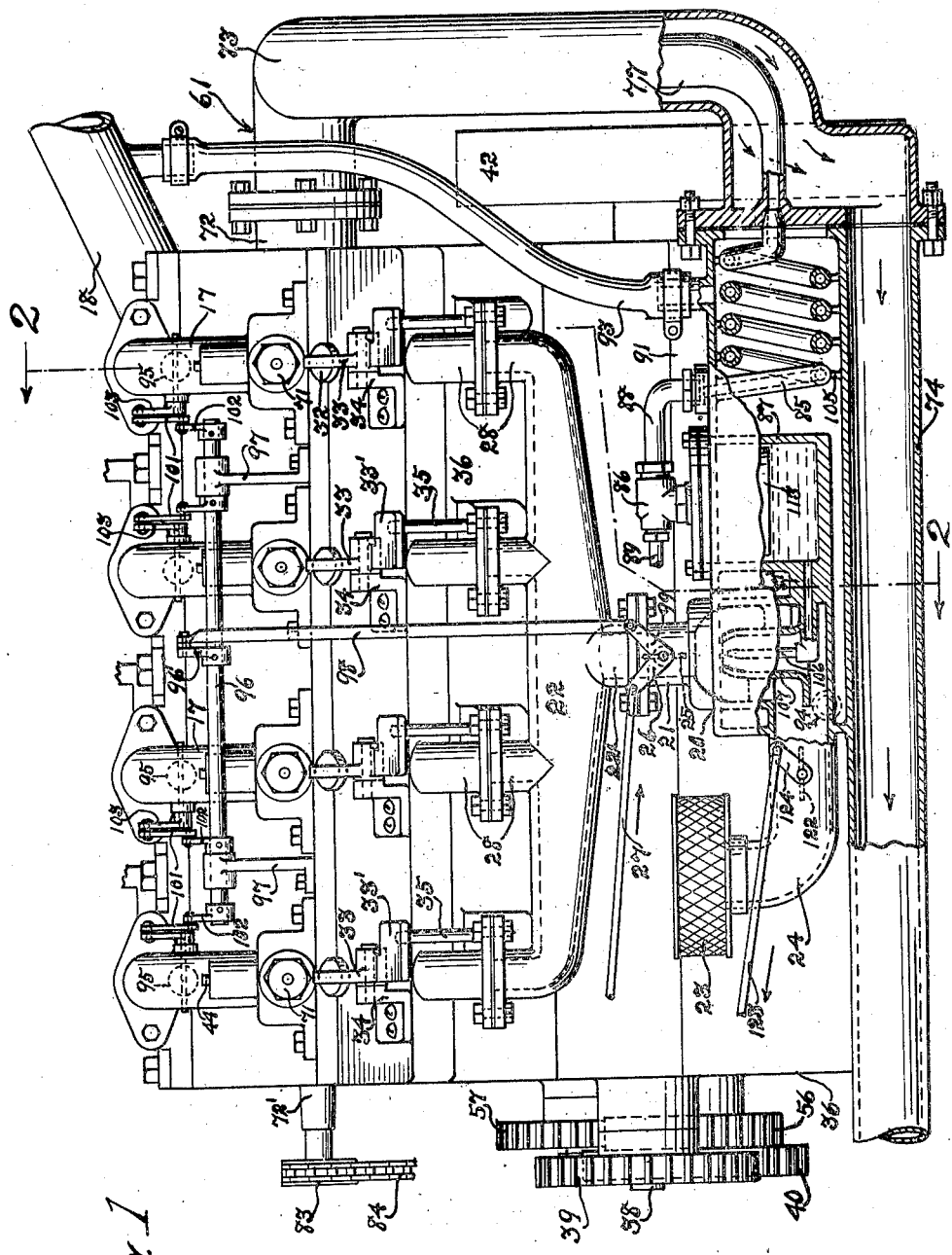
Fig. 1 is a side elevational view, partly in section, of my invention in its preferred form of construction.

In the drawings this invention is illustrated in its preferred form of construction, embodied in an internal combustion engine which is adapted to utilize as its fuel both gasoline and different types and grades of oil, comprising lighter oils, such as the usual fuel oils, and also the heavier oils, including crude oil. The construction illustrated comprises a combustion cylinder 11 containing a piston 12 therein, and a pre-compressing cylinder 13 containing a piston 14 therein and whereby the fuel mixture is compressed and preheated. A chamber 15 operatively connects the two cylinders and is adapted to store and to convey a required amount of pre-compressed fuel mixture from cylinder 13 to cylinder 11, at proper temperature and pressure to provide a full power stroke of piston 12. Cooling jackets 16 are provided around the cylinders and communicate with a cooling jacket 17 provided around chamber 15, while a hot water return pipe 18 conducts the hot water from said jacket to a suitable radiator, an inlet for the water to the cooling jacket being similarly provided.

A carburetor 20 has a neck 21 connected with the intake end 22' of the intake manifold 22, and has an air intake and filter member 23 connected to it by a conduit 24. A control valve 25 is provided in neck 21 and is operated by a crank lever 26 pivoted on said neck and by an operating rod 27 extending from the lever. From said manifold 22 the pre-mixed fuel charge passes thru the branch conduits 28 into the entrance chambers 29 provided at the upper ends of the several cylinders 13. A valve element 30 closes the valve seat on each cylinder 13 and descends to admit the fuel mixture from the chamber 29 into the cylinder.

Figure 3:
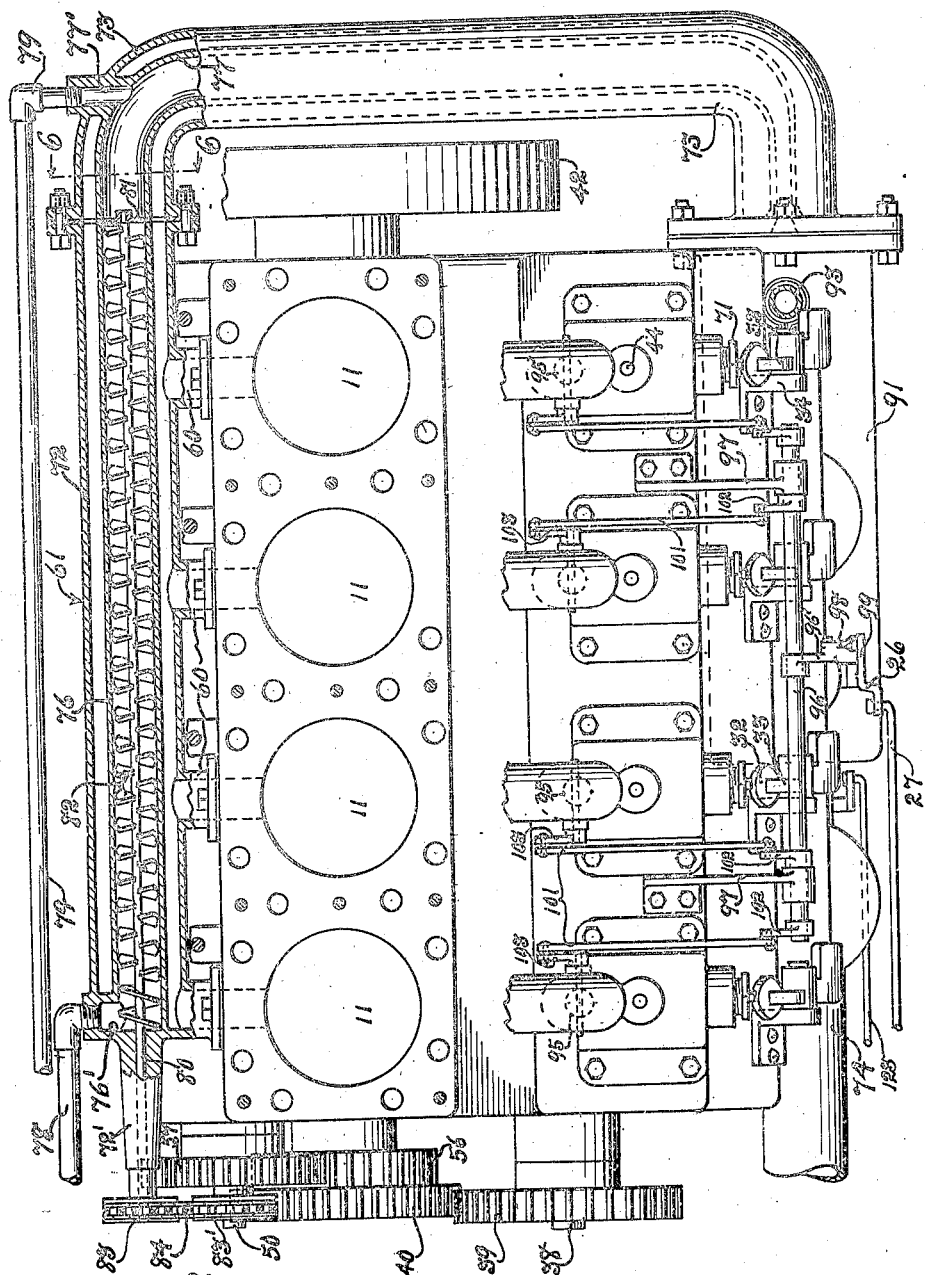
Fig. 3 is a top plan view, showing the heavy oil diffusing means in section and the engine head removed.

The means provided for operating these valves includes a spring 31 on the outer end of each valve stem 32 adapted to urge the valve 30 to its closed position, when the down stroke of piston 14 is completed. For closing these valves a rocker arm 33 is pivoted on a bracket 34 on the cylinder housing, and a rocker shaft 35 bears against the end 33' of arm 33 to depress stem 32 and open valve 30. Shaft 35 extends into the crankcase 36 and is actuated by a cam 37 on a cam shaft 38 which is driven thru an attached gear 39 (see Fig. 3) actuated by a gear 40 mounted on one end of a crank shaft 41 which carries the flywheel 42 on its other end.

A valve 43 on a stem 44 is urged by a spring 45 to the closed position on its valve seat, thereby closing communication between cylinder 13 and chamber 15. Valve 43 is thereby held closed during the main upward stroke of piston 14, so that the mixture in cylinder 13 will be properly compressed, and the valve will open when the proper pressure of the mixture is reached. The preheated and precompressed fuel mixture then enters chamber 15, and at the end of the upward stroke of piston 14 the valve 43 is closed by spring 45, and the mixture is confined in chamber 15.

A valve 46 closes the valve opening provided at the upper end of cylinder 11, to close communication between said cylinder and chamber 15. Said valve 46 is held closed by a spring 47 on a stem 48, until the stem is actuated by an opening mechanism which includes the cam 49 on a cam shaft 50, adapted to actuate a stem 51 adjustably connected to a rod 52 of which the upper end actuates a lever 53 pivoted at 54 on a bracket 55 provided on the cylinder casing. The free end of lever 53 bears on valve stem 48 to open valve 46 against the action of spring 47, at the proper time for the admission of the fuel mixture to combustion cylinder 11, thru the operation of timing gear means indicated at 56 and 57, which are driven by means of crank shaft 41.

An exhaust port 59 is provided in the peripheral wall of cylinder 11, and communicates thru a branch conduit 60 with exhaust manifold 61. This port 59 and the operating mechanism for valve 46 are arranged and timed so that the valve starts opening before exhaust port 59 is fully uncovered, thereby assisting the piston in clearing dead gases from said cylinder 11. When port 59 is closed by piston 12 during its upward stroke, then combustion cylinder 11 will be filled with a clean fuel mixture fed from chamber 15; whereupon lever 53 raises from stem 48 and spring 47 closes valve 46. Piston 12 then completes its upward stroke and the compressed mixture is fired by the action of a spark plug 62 mounted in the upper end of the cylinder, piston 14 being forced downward until it clears exhaust port 59 and the burnt gas is ejected into exhaust manifold 61.

A piston rod 64 is pivoted to piston 12 and to a crank 65 on crank shaft 41, and a piston rod 66 is pivoted to piston 14 and to an arm 67 off-set laterally from rod 64, thereby providing a definite advance of stroke of the supercharging piston 14 relative to the main piston 12.

A safety valve is preferably also provided for chamber 15. This comprises a bypass 68 provided in the top part of cylinder 13, connecting chamber 15 with chamber 29, said bypass being closed by a valve 69 urged by a spring 70. The tension of this spring and the action of this valve are adjustable, by operating an adjusting nut 71, so that the valve will open to pass fuel mixture from chamber 15 to chamber 29 when the pressure in chamber 15 becomes excessive.

Means is provided in this engine to adapt it for using various kinds and grades of oil as well as gasoline, and for utilizing the hot exhaust gases from the exhaust manifold for preheating the various oils, which are less volatile than gasoline, and for furthermore agitating and mixing and diffusing the heavier grades of oil to render the same sufficiently diffused and volatile to be fed thru the carburetor, like the gasoline.

For this purpose the exhaust manifold 61 is made of a special construction and includes a main portion 72 which is connected to the exhaust ports 59 of the several cylinders and extends alongside of the cylinders; and a second portion 73 which extends from said portion 72, along the end of the engine; also a third portion 74 which extends from said portion 73, along the opposite side of the engine and adjacent the carburetor 20, as best shown in Fig. 1.

An oil conveying conduit is provided, including two sections forming two connected chambers 76 and 77, which are mounted within and spaced from the inner walls of the manifold portions 72 and 73, respectively, thereby providing annular spaces wherein the exhaust gases flow around said two chambers 76 and 77. A supply pipe 78 is connected to the inlet port 76' of chamber 76, for conducting heavy oil or crude oil thereto; and a supply pipe 79 is connected to the inlet port 77' of chamber 77, for supplying light oil, such as fuel oil thereto.

Means for agitating and mixing and diffusing the heavier oil is provided. This means preferably comprises a mixing member mounted in chamber 76, to rotate therein, and includes a shaft 80, journaled at one end in the end part 72' of the manifold portion 72, and at the other end in a screening member or perforated member 81 which has outer ribs 81' and gas passages 81'' therebetween, as best shown in Fig. 6, being mounted between the adjoining ends of sections 76 and 77, by means of suitable flanges and bolts, for example. Agitating elements in the form of spaced blades 82 extend from said shaft 80, and are spirally directed, so as to cut and diffuse the heavier oil in said chamber and advance and force the same thru screening member 81 into the second chamber 77, to be further heated and to be rendered sufficiently volatile, like the lighter oil which enters chamber 77 thru conduit 79. Driving means is provided by sprocket wheels 83 and 83', secured on shafts 80 and 50, respectively, and a chain 84 traveling on said wheels. The heated and volatilized oil is then conducted from said chamber 77 thru suitable conducting means to the carburetor 20.

Means is also provided for condensing the preheated oil, and this means preferably comprises a coil 85 interposed in said conducting means, and connected with a double-inlet member or T-connection 86 which is connected with a float chamber 87 that is connected to and made integral with the carburetor 20, by means of a neck 87'. From said coil 85 the heated and condensed oil flows thru a connecting pipe 88 to one arm of the T-connection 86 and therefrom into float chamber 87. A gasoline supply pipe 89 is connected to the other arm of said T-connection, for conveying gasoline directly to the float chamber of the carburetor, in the usual manner. A condensing or cooling jacket 91 is provided around said coil and around carburetor 20 and float chamber 87, to provide a cooling chamber 92 within said jacket and around said members. This chamber 92 has its upper end connected thru an inlet tube 93 with the hot water return pipe 18 of the engine (see Fig. 1); and thru an outlet tube 94 with the water jacket of the engine (see Fig. 2.). The water from the engine jacket will thus circulate thru this cooling chamber in this jacket 91 and serve to cool and condense the highly heated and volatilized oil in coils 85 and in its passage thru the float chamber and carburetor, and will serve to maintain a fairly constant and proper temperature of the oil therein.

To furthermore retain the temperature of the heated oil constant, and to avoid a sudden or excessive reduction of the temperature of the heated oil in said coils and said float chamber, the third portion 74 of the exhaust manifold is extended alongside of and adjoining said coils and chamber and carburetor, so that if any sudden cooling effect occurs, as by pouring a quantity of cold water into the radiator, any sudden excessive cooling effect on said coils and the heated oil therein will be avoided.

A control valve 95 is also provided in each chamber 15 for definitely controlling the flow of fuel therethru to the combustion cylinder 11; and means is further provided for synchronizing the several control valves 95 of the several cylinders 11 with the control valve 25 on the carburetor. This means includes a rocker shaft 96 mounted on brackets 97 on the engine and having an arm 96' connected to a link 98 which is pivoted to a crank arm 99 provided on crank lever 26 of the carburetor control valve 25. Links 101 are connected to arms 102 provided on said shaft 96 and to arms 103 extending from the shafts of the several control valves 95. Upon operating the rod 27, the several control valves 95 will be operated in unison along with the throttle valve 25.

As shown in the drawings the cooling jacket 91 and the enclosed carburetor with its float chamber and the condensing coils are all arranged as a unitary construction. The coils are held in place in the jacket by means of ribs 105. The third section 74 of the exhaust manifold is also constructed integral with this cooling jacket, so as to provide a compact and economical construction.

The carburetor 20 is especially arranged, and comprises an inner fuel nozzle 106, concentric in and spaced from an intermediate air-conveying tube or tubular member 107, which is spaced from and is mounted by arms 108 on the inner wall of the carburetor housing, as best shown in Fig. 4. The air entering thru filtering member 23 and conduit 24 will thus flow upwardly within tubular member 107, and around nozzle 106, to be co-mingled with the fuel from said nozzle in the upper end 107' of said member 107, which constitutes a primary mixing channel; and the air will additionally flow upwardly in the carburetor housing, around tubular member 107, and into the upper part 109 of said housing, where it will further combine with the mixture of air and fuel flowing upwardly from said primary mixing channel 107', said part 109 thus forming a second mixing chamber, whereby the air and fuel are thoroughly mixed in this carburetor. The float chamber 87 is provided with a valve needle 110 movable in a collar 111 in said chamber, and is adapted to close the valve seat in branch 112 of T-connection 86 at the top of said chamber 87. A dome-shaped float 113 is provided in chamber 87 to press under valve needle 110 and force it into the closed position when chamber 87 is sufficiently filled.

As indicated in Fig. 7, tank means is provided for storing the several desired fluids as gasoline and light oil and heavy oil; and control valve means is provided in conjunction with said tank means for selectively admitting the fuel to the engine. The tank means includes several compartments or tanks, and as shown in Fig. 7, it comprises a compartment 116 for gasoline, a compartment 117 for light oil, and a compartment 118 for heavy oil or crude oil. Said gasoline compartment 116 is connected thru pipe 89 with the T-connection 86 on the float chamber 87; while the light oil and heavy oil compartments 117 and 118 are connected, respectively, through conduits 79 and 78 with the light oil receiving and preheating chamber 77, and the heavy oil receiving and mixing chamber 76. These conduits are joined to a control valve 120 provided with an operating handle 121, said valve being conveniently located, for controlling the flow of the selected fuel to the engine.

The usual choke valve 122 is also provided in the air channel 24 on the carburetor, and an operating rod 123 extends from the arm 124 on said valve to be operated in the usual manner.

While I have disclosed a certain preferred embodiment of my invention, this is to be taken as illustrative only, as it is capable of change and variation to meet differing conditions and requirements, and I contemplate such changes and modifications as come within the spirit and scope of the appended claims.

I claim:

1. In an internal combustion engine provided with intake means and fuel and air mixing means thereon, an exhaust manifold connected with the cylinder exhaust of the engine and extending toward the intake manifold, liquid fuel conducting means mounted within the exhaust manifold to be heated by the exhaust gases therein, means operative in said conducting means for mixing and diffusing the liquid fuel therein, and means operatively connecting said conducting means with said mixing means and including means adapted to condense the preheated fuel therein.

2. In an internal combustion engine provided with an intake manifold having fuel and air mixing means thereon, an exhaust manifold including a main portion having branches connected with the cylinder exhausts, also including a second portion extending from said main portion, a liquid fuel conduit including two sections mounted within said two manifold portions, to be heated by gases passing thru said portions, means for conducting heavy oil to the first section of said conduit, a member in said first section, adapted to rotate for diffusing heavy oil therein and advancing it to the second section, means for conducting light oil to said second section, and means operatively connecting said conduit with said mixing means.

3. The subject matter set forth in claim 2, wherein said means for conducting the oils from the conduit is provided with condensing coil means and a cooling jacket surrounding the same.

4. In an internal combustion engine provided with an intake manifold, an exhaust manifold extending from the cylinder exhausts of the engine, a conduit including two chambers extending thru part of the exhaust manifold to be heated by the exhaust gas therein, the first chamber for receiving heavy oil and the second chamber for receiving light oil, a partition with perforations between said chambers for spreading the oil, means in said first chamber adapted to rotate and mix and diffuse the heavy oil and force it thru said partition into the second chamber, a carburetor on said intake manifold, and means for conveying and for condensing the heated oil flowing from the second chamber to the carburetor.

5. In an internal combustion engine provided with an intake manifold, an exhaust manifold extending from the cylinder exhausts of the engine toward the intake manifold, a conduit including two chambers extending thru part of the exhaust manifold and spaced from the interior thereof, the first chamber adapted for receiving heavy oil and the second chamber adapted for receiving light oil, means in said first chamber for mixing and diffusing the heavy oil and advancing it to the second chamber, and means including condensing means and a carburetor operatively connecting said second chamber with the intake manifold, a part of the exhaust manifold extending adjacent to and being connected with the condensing means for preventing too great a condensing and cooling effect by the latter means on the oil.

6. In an internal combustion engine provided with an intake manifold, an exhaust manifold extending from the cylinder exhausts toward the intake manifold, said exhaust manifold including several successive portions, a conduit having two chambers which extend thru the first two portions of the exhaust manifold, the first chamber adapted for receiving heavy oil and the second chamber for receiving light oil, rotary means in said first chamber for mixing and diffusing the heavy oil and advancing it to the second chamber, means including condensing coils and a carburetor for conducting the oil from the second chamber to the intake manifold, and water jacket means surrounding said coils and carburetor, another portion of said exhaust manifold extending closely adjacent said water jacket, for preventing too great a cooling effect by said water jacket on said coils.

7. The subject matter set forth in claim 6, and wherein the water jacket has conduits connecting it with the water cooling mechanism of the engine.

8. In an internal combustion engine provided with an intake manifold, an exhaust manifold extending from the cylinder exhausts toward the intake manifold, a conduit having two chambers which extend thru part of said exhaust manifold, the first chamber adapted for receiving heavy oil and the second chamber for receiving light oil, a shaft having spirally extending means thereon and journaled in said first chamber for mixing and diffusing the heavy oil and advancing it to the second chamber, means for rotating said shaft, condensing coils receiving the heated oil from said second chamber, a carburetor receiving the oil from said coils and delivering it to the intake manifold, a cooling jacket surrounding said coils and carburetor, means connecting said jacket with the cooling system of the engine, and an extending part on the exhaust manifold which is joined to and is integral with the water jacket.

9. The subject matter set forth in claim 8, and wherein said coils and the float chamber are connected by oil conducting means which is provided with branch inlet means for admitting gasoline to the float chamber.

10. In an internal combustion engine, an intake manifold and a carburetor connected therewith and having a float chamber thereon, branch means on the intake end of the float chamber including means for conducting gasoline and a conduit for conducting oil to said intake end, means on said oil conducting conduit for heating the conduit and oil therein by means of exhaust gas from the engine, means interposed in the oil conduit for condensing the oil, and a cooling jacket around said condensing means and the float chamber and the carburetor.

11. In an internal combustion engine, an intake manifold having a carburetor thereon, a branch member connected with the carburetor including one branch for conducting gasoline and another branch for conducting oil thereto, an oil supply conduit connected to said branch for oil, an exhaust manifold extending from the cylinder exhausts to the carburetor, the oil conduit being partly extended thru said exhaust manifold for preheating and vaporizing the oil therein by means of the hot exhaust gas, condensing means interposed in said oil conduit adjacent the carburetor, a cooling jacket surrounding said condensing means and carburetor, and conduits connecting said cooling jacket with the water jacket of the engine.

12. The subject matter set forth in claim 11, and wherein an extending portion of the exhaust manifold is joind to and integral with said cooling jacket for preventing too great a cooling effect on the condensing means.

13. In an internal combustion engine having an intake manifold, a carburetor connected to said manifold and having a float chamber thereon, fuel conducting means including condensing coils connected to the inlet end of the float chamber, a water jacket surrounding said coils and carburetor and float chamber, for cooling and condensing fuel in said coils, and means for conveying exhaust gas, adjoining said water jacket, to prevent excessive cooling effect thereby on the coils, said carburetor and chamber and coils and gas conveying means being integral with said water jacket.

14. In an internal combustion engine provided with an exhaust manifold and an oil supply conduit connected therewith and heated by the exhaust gases passing therethru, a cooling jacket having a condensing coil in one end thereof adapted to be connected to said conduit, an air intake member on the other end of said jacket, a carburetor housing in said jacket, adjacent said member, an air tube in said housing, adapted to have an oil nozzle mounted therein, and a float chamber in said jacket connected by a tubular neck to said housing, said air intake and coil and chamber and housing with its tube therein, all consisting of one integral construction with said cooling jacket.

PIETRO MANISCALCO.